Figure 1:
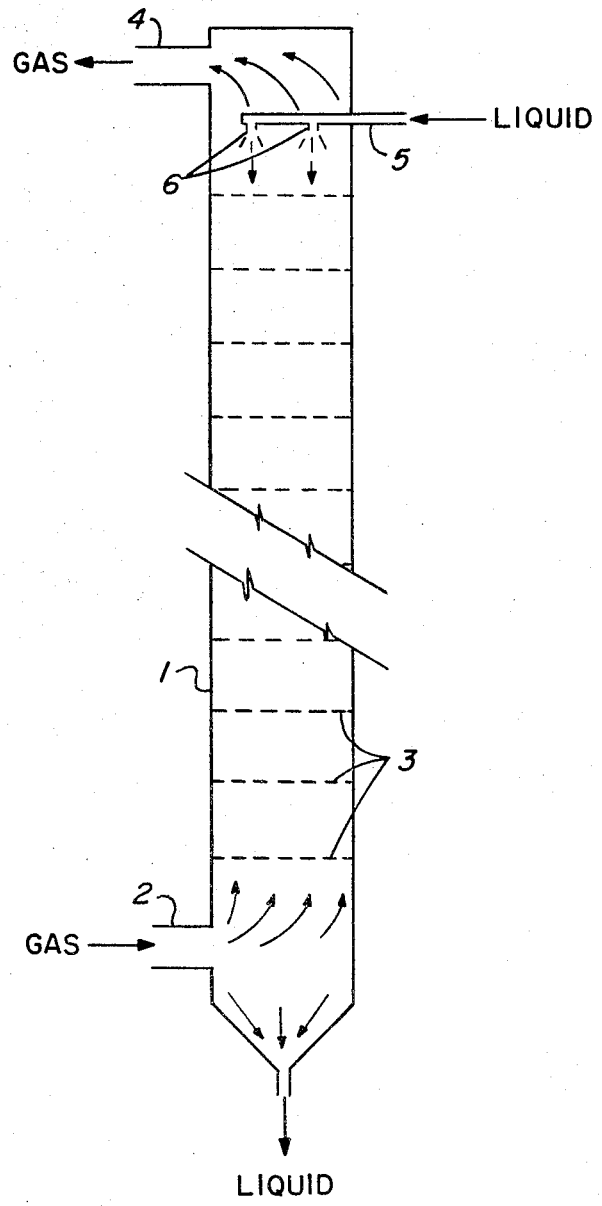
Figure 2:
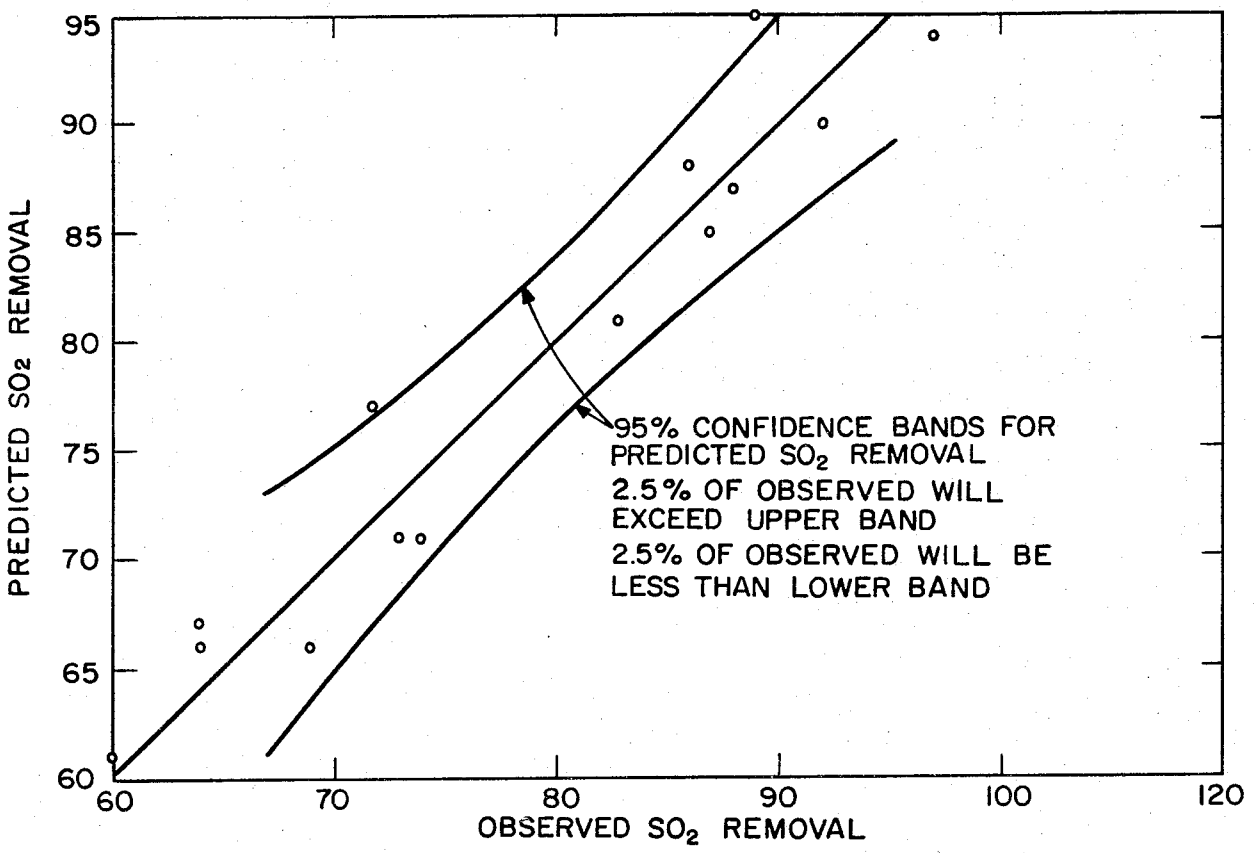
Figure 3:
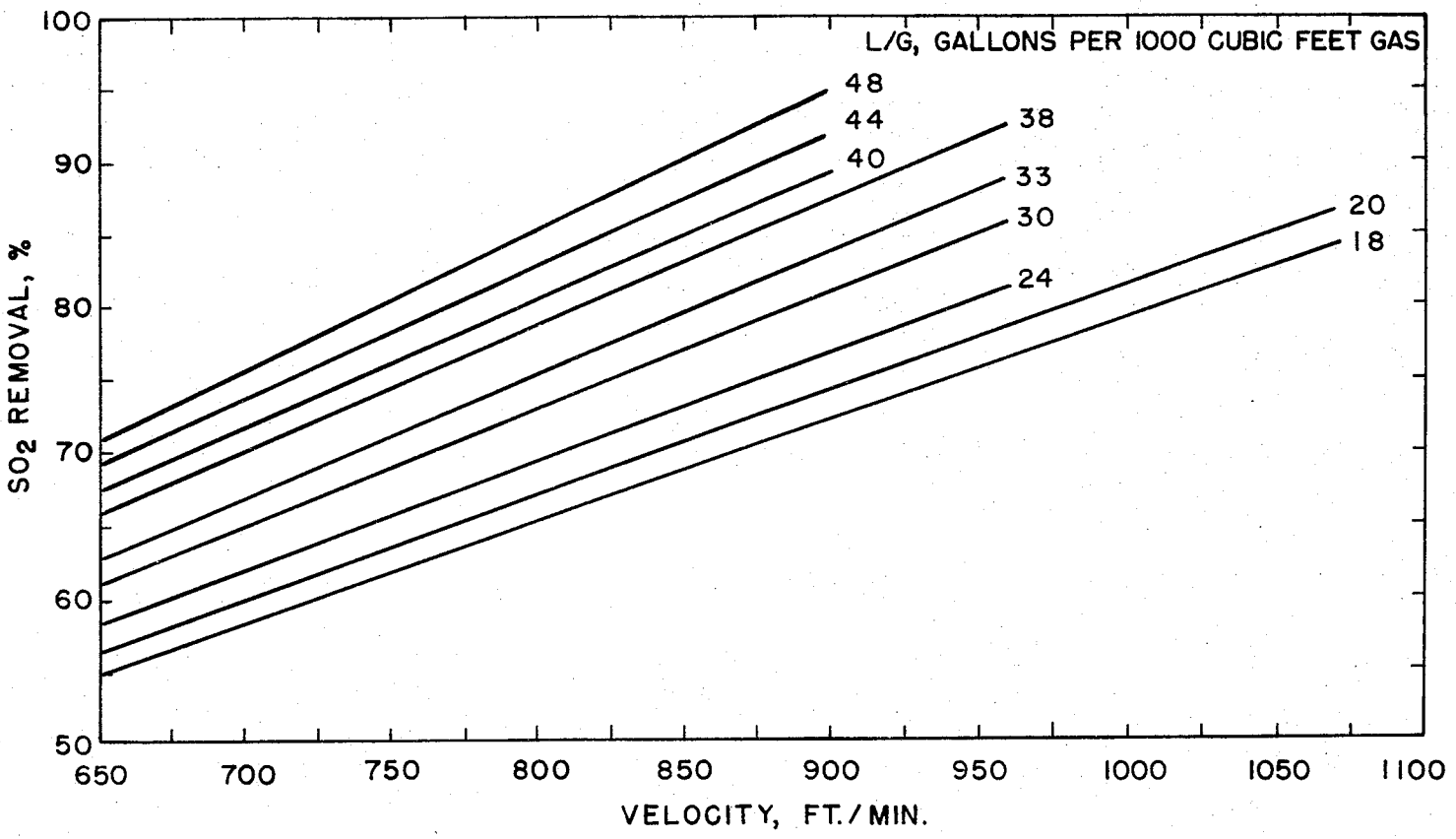

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 11, 1973

914 O.G. 399

T914,006

MULTIGRID SCRUBBER FOR GAS-LIQUID STREAMS

Phebus C. Williamson, Rte. 7, Russellville, Ala. 35653, and Neal D. Moore, 76 Lynn Brook Circle, Chattanooga, Tenn. 37415

Filed Sept. 14, 1972, Ser. No. 289,074
Int. Cl. B01d *53/14*
U.S. Cl. 55—73
3 Sheets Drawing. 10 Pages Specification

Means and methods for mass transfer from a gas stream to a liquid or a slurry stream by countercurrent contact in a vertical scrubber shell having a plurality of horizontally arranged grids. The purpose of the grids is to obtain intimate mixing of the two countercurrent streams to effect the desired mass transfer. Experience has shown that the grid packing has advantages over both the conventional fixed-bed scrubbers and the mobile-bed scrubbers. The multiple-grid scrubber is operational without excessive pressure drops at gas velocities up to and exceeding 1100 feet per minute, a significant velocity increase over the 500-foot-per-minute limit for the fixed-packing scrubber because of flooding and the 750-foot-per-minute operational limit because of excessive pressure drop for the mobile-packing scrubber. In addition to the increased gas velocity, the multiple-grid scrubber does not have the added disadvantage of sphere erosion experienced with the mobile-bed scrubbers.

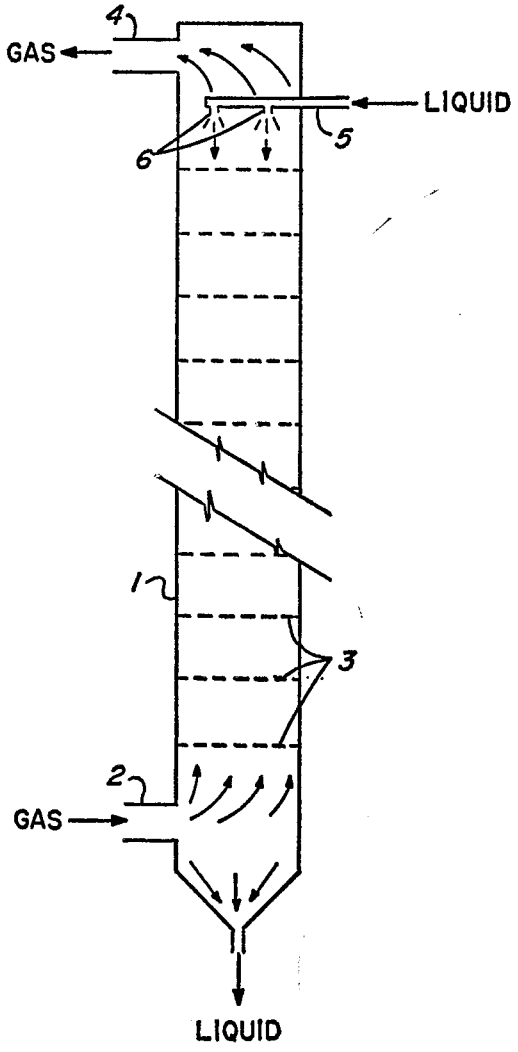

MULTIGRID SCRUBBER FOR GAS-LIQUID STREAMS

Filed Sept. 14, 1972 3 Sheets-Sheet 1

TVA MULTIGRID SCRUBBER

PREDICTED $SO_2$ REMOVAL vs OBSERVED $SO_2$ REMOVAL

EFFECT OF GAS VELOCITY ON $SO_2$ REMOVAL AT VARIOUS LIQUID RATES